Jan. 12, 1965  H. A. ABLETT ETAL  3,165,211
CARGO SHIP DESIGN FOR QUICK LOADING AND DISCHARGE
Filed Jan. 25, 1962  4 Sheets-Sheet 1

INVENTORS
HAROLD A. ABLETT
GEOFFREY E. CHILDS
PAUL K. JOHNSON
VERNARD A. KEERBS

BY George F. Westerman
ATTORNEY

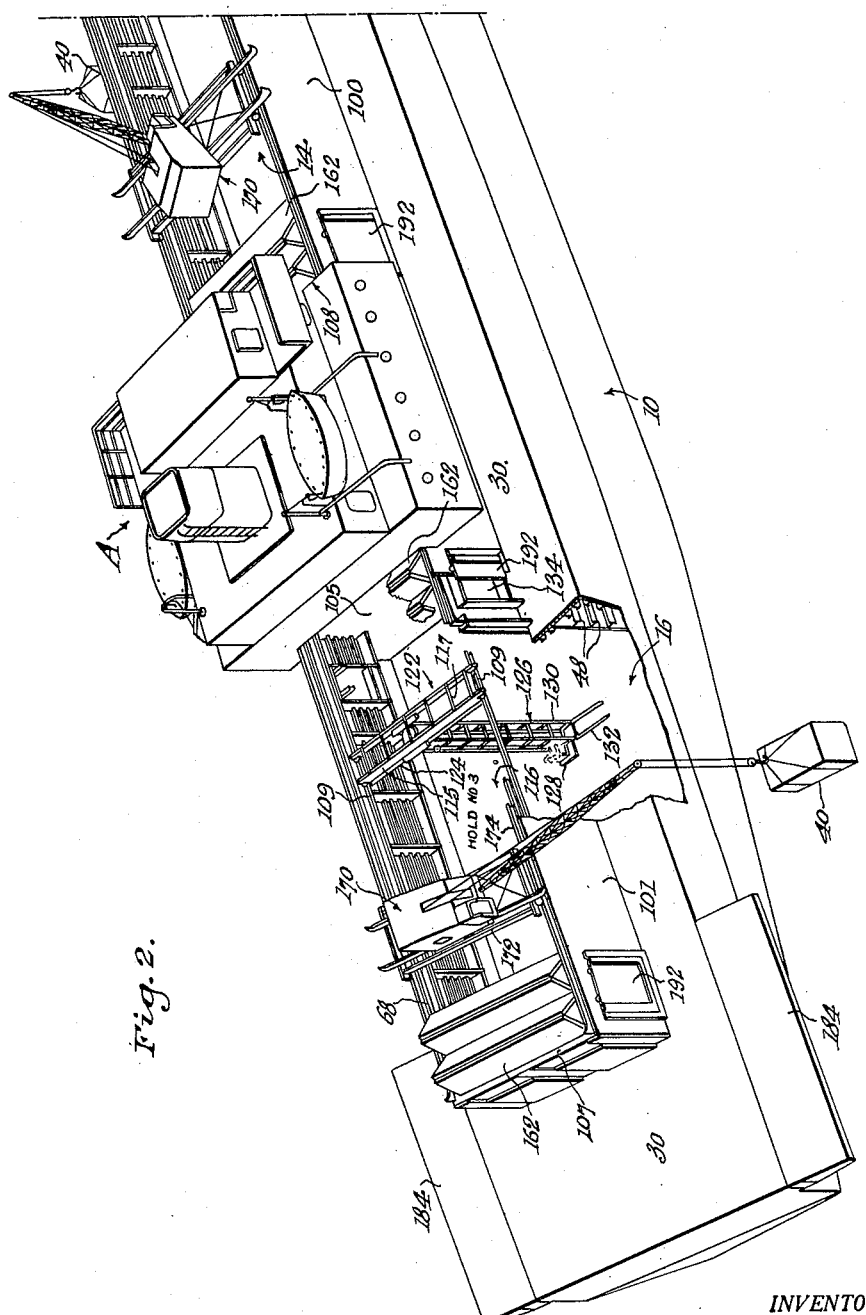

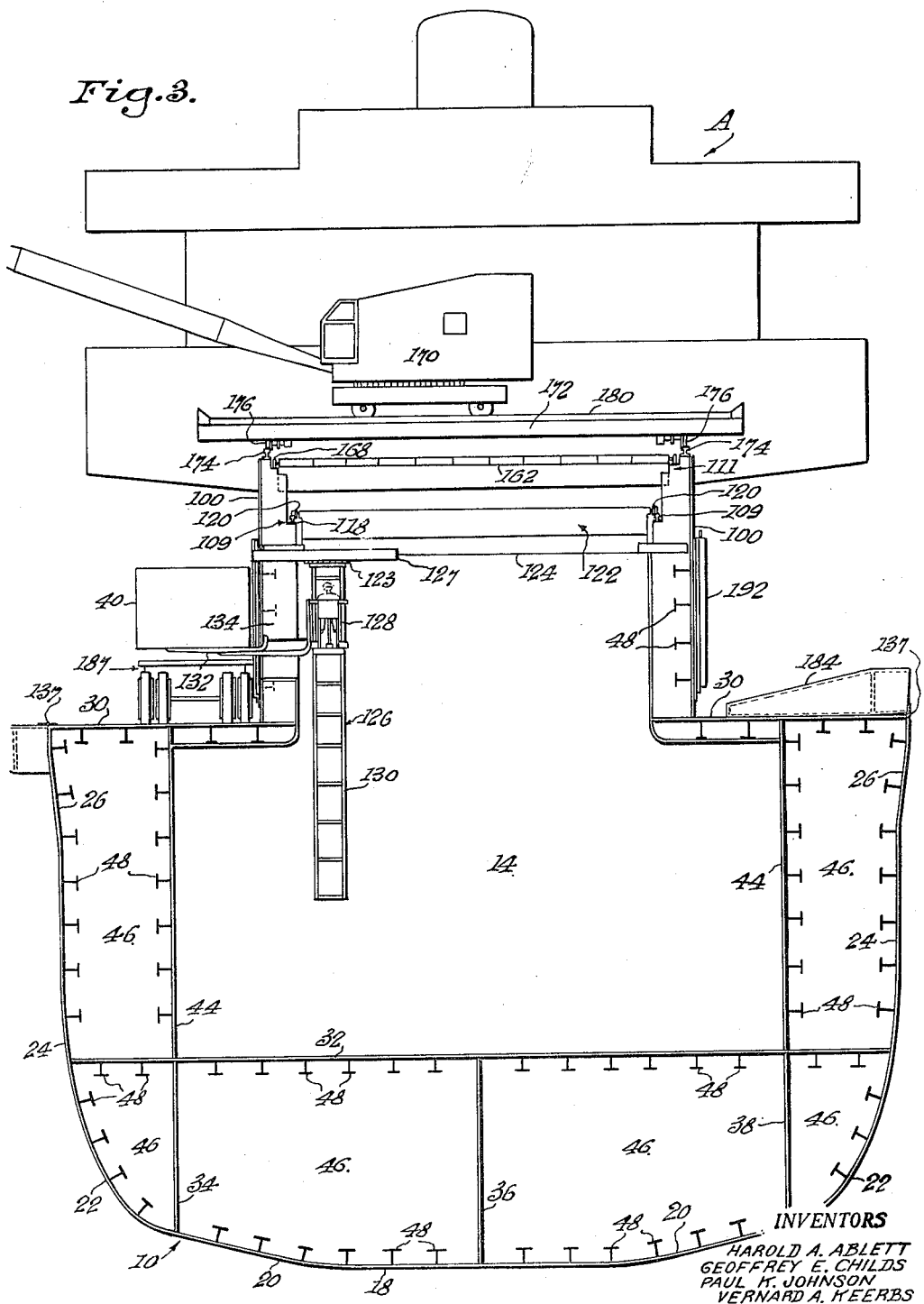

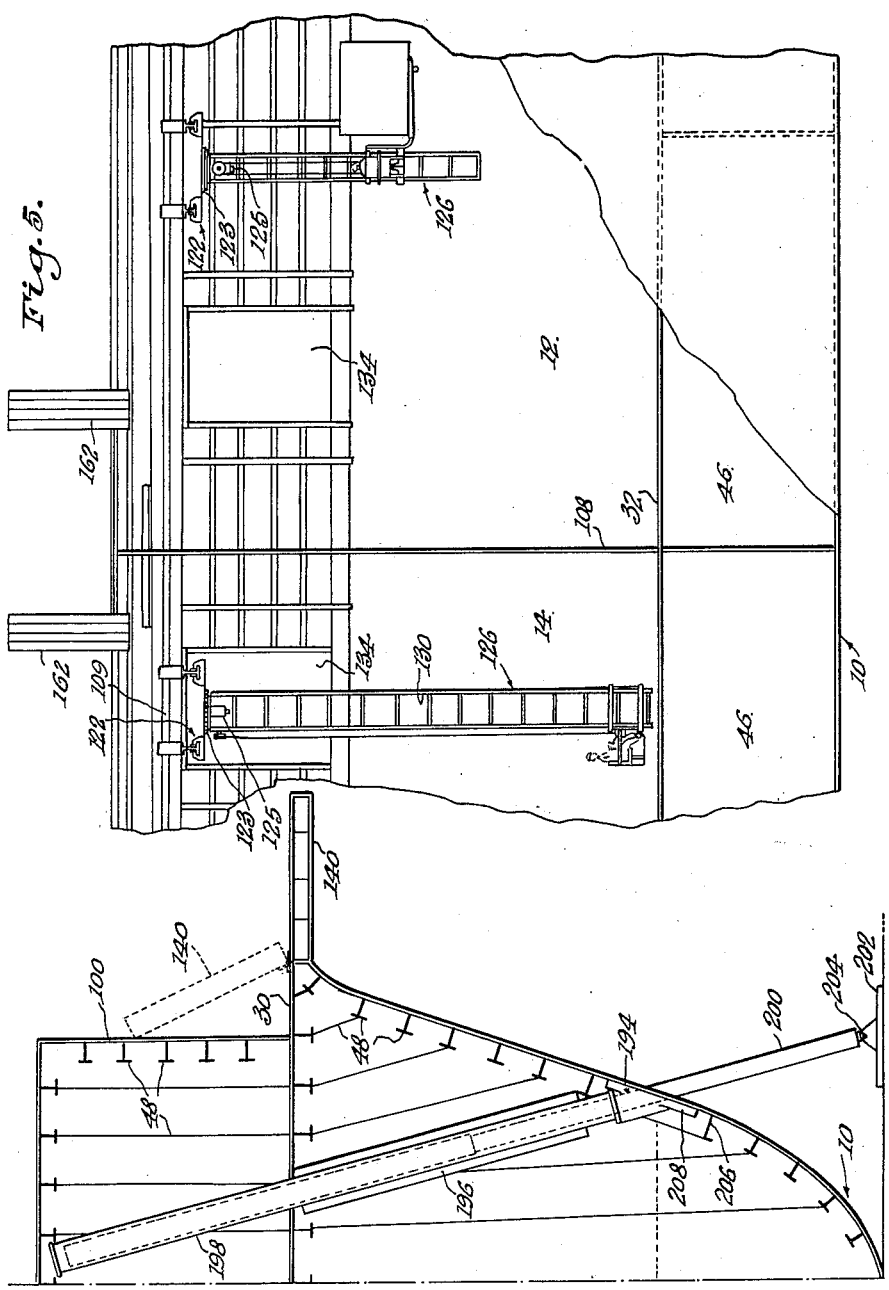

3,165,211
CARGO SHIP DESIGN FOR QUICK LOADING
AND DISCHARGE
Harold A. Ablett, Singapore, Malaysia, Geoffrey E.
Childs, Maresfield, Sussex, England, Paul K. Johnson,
Newport News, Va., and Vernard A. Keerbs, Churdan,
Iowa, assignors to the United States of America as
represented by the Secretary of the Army
Filed Jan. 25, 1962, Ser. No. 168,858
9 Claims. (Cl. 214—15)

The present invention provides improvements in cargo ships or freighters and more particularly the present invention provides improvements in instrumentalities for facilitating stowage and unloading of items of freight or cargo of highly diversified character and in widely varying parcel sizes. The improvements of the invention enable rapid transfer of the cargo in a direct manner between ship and shore, by "shore" being intended to embrace a dock or wharf, or a beach. The instrumentalities provided by the invention enable a highly flexible and rapid placement of items of cargo on a ship from an accumulation thereof on a shore location, and for a rapid unloading thereof at a second shore location. The need for speed in the handling of cargoes may be great in such activities as military operations.

Although the improvements of the present invention are intended principally for shallow draft cargo ships, it will be apparent that the equipment of the instant invention is not limited necessarily to embodiments of such character. The instrumentalities of the invention may be adapted generally to any freight-carrying equipment where expeditious handling and transfer of the freight load is desirable. Objects and advantages of the instrumentalities provided by the invention will become apparent as the description proceeds and the features of novelty will be pointed out and defined in particularity in the appended claims.

In the accompanying drawings:

FIG. 1 is a perspective view of the forward part of an illustrative type of a cargo-carrying ship, looking from the bow to amidships portions the view showing forward cargo-receiving holds with accordion-hinged covers in retracted positions, the view also showing, in operative position a hingedly mounted cargo-deck extension secured to a cargo deck and to the hull, together with a loading ramp hingedly secured to the deck extension and there being shown hull-stabilizing mechanism in operative position for preventing possibly excessive tilting of the hull in any condition of cargo transfer;

FIG. 2 is a perspective view in continuity with FIG. 1, and continuing FIG. 1 aft to substantially the stern of the ship;

FIG. 3 is a vertical transverse section through the hull, looking aft from approximately amidships, but from a position forward of the superstructure;

Figure 1:
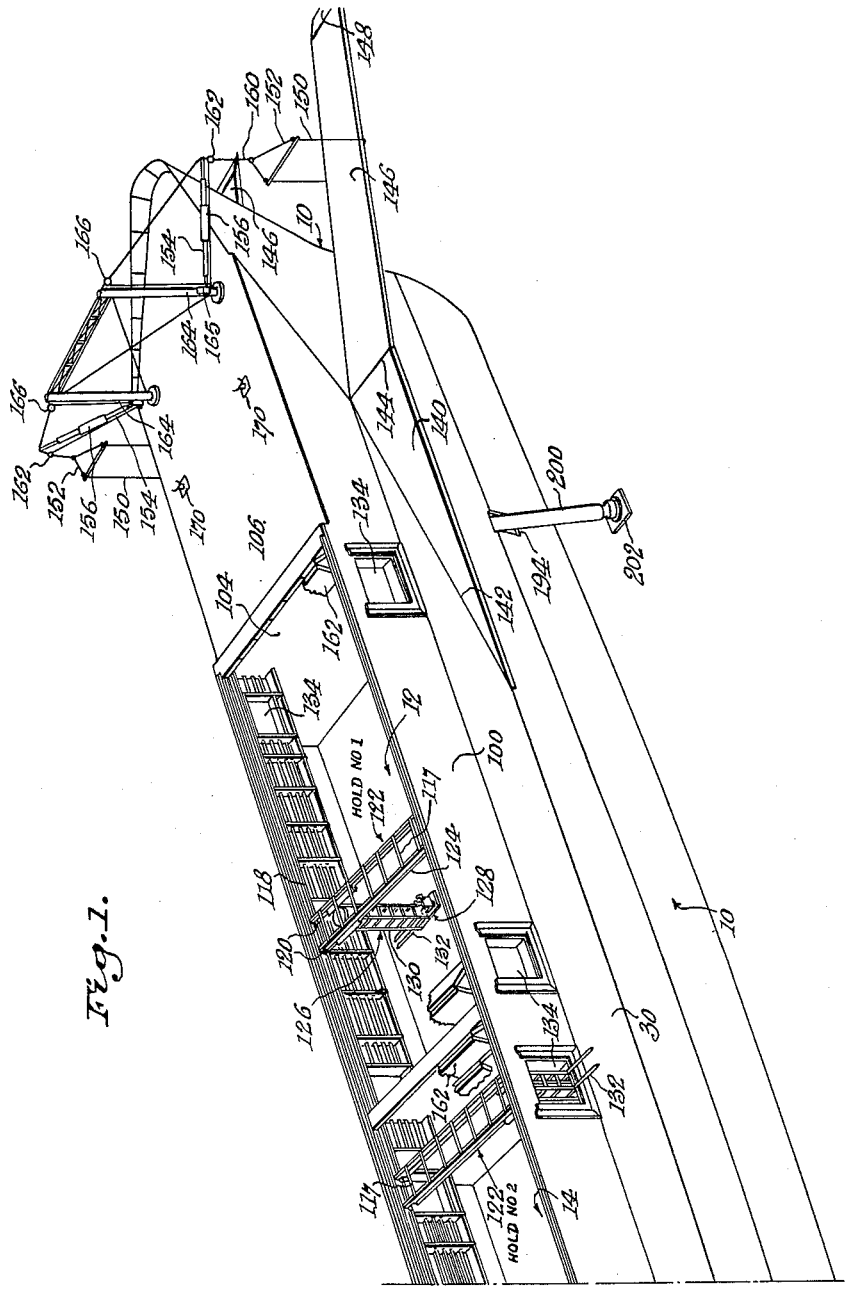

FIG. 4 is a fragmentary transverse forward section of a portion of the hull looking aft from a position adjacent to the hull-stabilizing means, shown in operative position in FIG. 1, the view also indicating a fragment of the hinged deck extension, in extended operative position and, in dotted lines, in stowed position; and FIG. 5 is a fragmentary perspective view similar to a portion of FIG. 1, but illustrating on an enlarged scale, certain of the improved instrumentalities provided by the present invention, such being shown in different positions of operation.

Referring more particularly to the drawings, reference numeral 10 indicates by way of illustrative example, an improved hull structure of a cargo-carrying vessel in which there has been incorporated improved cargo-handling instrumentalities constructed and arranged in accordance with the present invention, which improved instrumentalities are installed in, or associated with a series of cargo-receiving holds in the hull 10, which holds are designated, from forward to aft, as "Hold No. 1," "Hold No. 2," and "Hold No. 3," or also by reference numerals 12, 14, and 16, respectively. The hold construction will be referred to in greater detail hereinafter. Each hold requires a hatch in the weather deck of the vessel, each hatch being somewhat less coextensive in area with the area of its hold.

The structure of the hull itself represents a departure from what is considered to be conventional structure in providing a reinforced construction at each of the ship sheers, this being the two areas adjacent to the lines along which the port and starboard sheer strakes of the hull intersect the weather deck. In addition to this ship sheer construction, there are provided a multiplicity of side wall reinforcements, stiffening and reinforcing beams welded to all interior surfaces of the hull structure, as will be evidenced by FIG. 3 of the accompanying drawings.

From this view, it will be seen that the keel 18 is joined on each side to garboard strakes 20, the outer edges of which are united to bilge strakes 22, which in turn, are joined to side strakes 24. These side strakes 24 are secured on their upper edges to sheer strakes 26.

Continuing reference to FIG. 3, it will be seen that a cargo deck 32 is spaced above the bottom structure of the hull and is the bottom of the holds, which supports the cargo, and it also is the top of various tanks which subdivide the space between the cargo deck 32 and the bottom of the hull, for carrying ballast, fuel oil, or other commodities. Such tanks are delineated on FIG. 3 by partitions 34, 36, and 38, which partitions also reinforce the cargo deck 32.

The weather deck 30 has a width along the narrowest portion of its length sufficient to enable placement and manipulation of cargo items or packages, such as are indicated at 40, which may have been brought on the deck 30 loaded on a wheeled vehicle, such as a trailer or truck.

Spaced inwardly from the hull strakes 26 and 24, and connecting the underside of the weather deck 30 at approximately half the width of the narrow portion of the weather deck to the upper surface of the cargo deck 32 are vertical partitions 44 which define the side walls of the holds, the indicated spacings of the partitions 44 from the hull strakes affording spaces which define tanks, indicated generally by reference numeral 46, for containing ballast, fuel oil, or other materials. This applies also to the bottom tanks between the cargo deck 32 and the bottom hull strakes 20.

Reinforcing beams 48 are welded to such parts and to suitably convenient portions or elements of the hull and are provided in numbers and locations to effect thoroughly requisite reinforcement and rigidity for the hull strakes, partitions and other structural parts including decks, which may require enhanced strength and rigidity. These beams 48 are illustrated as I-beams extending longitudinally and horizontally with respect to the hull as needed.

The hatches of the holds are enclosed by a hatch enclosure, the forward hatches being enclosed by longitudinally extending vertical parallel walls 100, which extend from the bulkhead wall 104 of the foredeck 106 to the forward bulkhead wall 108 of superstructure A, which is located in amidship portions of the hull, and is terminated by aft bulkhead wall 105. The bulkhead walls 104 and 108 are coextensive in height with the longitudinally extending walls 100 and define end closures therefor. In similar manner, the aft hold and hatch are enclosed by longitudinally extending, vertical parallel walls 101, the aft bulkhead wall 105 of superstructure A forming the forward closure for the aft hatch enclosure, transverse end wall 107 defining the aft closure therefor.

The upper portions of the forward longitudinal walls 100 and of the aft longitudinal walls 101 are recessed at 109 and 111, such recesses being oppositely disposed. Recesses 109 receive longitudinally extending track rails 118 on which is mounted for longitudinal movement by means of rollers 120, a carrying frame 122, each of which frames extend transversely across its hatch. There is one of these frames 122 in each hatch. The frame 122 are identical in construction and they are identically movable longitudinally through the respective hatches on rails 118 and the engagement of rollers 120 of each frame with track rails 118.

Each of the frames 122 comprises spaced lateral I-beams 115 connected by cross-members 117. Bottom flanges of I-beams 115 form tracks from which is suspended for movement therealong an assembly which may be designated as a "stacker crane" which is indicated at 126, and which is movable both transversely and longitudinally with respect to its hatch and hold, as it is suspended for movement along the track flanges of lateral I-beams 115 which movement carries the stacker crane 126 across its hatch and hold, while movement of the frame 122 on rails 118, carries the stacker crane 126 longitudinally through its hatch and hold.

Each of the stacker cranes 126 is composed of telescoping sections operable generally similar to an extension ladder, such construction enabling the length of the stacker crane to be shortened or lengthened, as may be needed by an operator seated in a seat 128, which is mounted for vertical movement along vertical side rails 130 of the stacker crane.

The seating station 128 for the stacker crane operator carries forklift blades 132 for handling and positioning (loading and unloading) miscellaneous items of cargo, such being enabled by provision of lateral openings or ports 134 extending through the walls 100 of the hatch enclosing structure previously referred to. These lateral ports are closely adjacent to the weather deck, on both starboard and port side and are sufficiently large to enable passage of the forklift prongs 132 through the openings 134 and between the items of cargo being handled and the weather deck 30 so that the items of cargo being loaded may be lifted and withdrawn from the weather deck 30 through the openings into the hold and placed therein by suitable movements of the operator's seat and stacker crane, as has been stated above. Each of the stacker cranes 126 is completely rotatable on its vertical axis by means of a rotating gear 123, which is operated by a motor positioned in a housing 125. The rotation of the operator's seat 128 and of the forklift blades 132 along with the stacker crane 126, and the vertical movement of the operator's seat and the forklift blades resulting from telescoping of the sections of the stacker crane and travel of operator's station 128 up and down vertical side rails 130 coupled with the longitudinal movement of the stacker crane 126 along track rails 118 through the length of each hold, and travel of the stacker crane 126 along rails 124 produces the substantial equivalent to a universal movement of the stacker crane 126 and also to the forklift 132, thereby enabling placement of the cargo at any desired location in the selected hold.

The weather deck 30 begins forwardly on both starboard and port sides, beginning on each side with the hinge connection 142 to the foldable deck extension 140, and extends aft by the hatch enclosing walls 100, superstructure A, and hatch enclosing walls 101. The width of these portions of the deck 30 is equal on both sides of the hatch enclosing walls 100, superstructure A, and aft hatch-enclosing walls 101. When the rear transverse wall of the hatch-enclosing wall structure is reached, the weather deck 30 becomes continuous and contiguous with the width of the hull from the rear wall 107 to the stern.

The weather deck 30 affords a convenient depository for cargo to be in a hold or to be unloaded from shipboard. This placement of cargo items on deck 30 may be facilitated by the provision of the weather deck extensions 140 on each side of the structures mentioned above, such extending along approximately the forward quarter of the hull, the hinge connections between the extensions 140 and the decks 30 enabling the deck extensions 140 to be folded upwardly against the hull 10 for stowage. Hingedly connected to the deck extensions 140 as indicated at 144 is a loading ramp 146 which is adapted to rest upon a solid level surface, such as a dock or wharf or beach with respect to which the cargo is being transferred. As has been indicated above, the cargo deck 38, deck extension 140 and loading ramp 146 are duplicated on both sides of the hull.

Each of the loading ramps 146 is supported in a sling structure 150, which is suspended from a boom 154, the length of which is adjustable through the provision of a length-adjusting sleeve 156, the sling structure 150 being suspended from cable 160 which cable 160 passes over pulley 162 on to an outer end of boom 154, this cable passing along the length of boom 154 and around a pulley 165 at the base of upright 164 thence around top pulley 166 on upright 164 to the outer end of the boom 154. Brackets 170 mounted on the foredeck 106 secure the boom 154 when the latter is not in use. This structure is duplicated for each boom and ramp.

It will be noted that the cargo ports 134 are disposed adjacent to the cargo deck 30 and extension 140, providing communication between the deck or extension and a hold with respect to which the cargo is being manipulated by the stacker crane in that hold. The universal adjustment of the stacker crane enabling ready and rapid handling of the items of cargo, and placement thereof in the best available location in the respective hold. Items of cargo on deck 30 and deck extension 140 are accessible to the forklift blades 132 responsively to appropriate manipulations of the stacker crane in such hold so as to extend and retract the forklift blades with respect to the cargo ports 134.

The respective cargo holds are closable at their tops by means of complemental, sectionalized, hinged covers composed of panels 162 which are long enough to span the width of the vertical walls 100 and 101. A panel adjacent to a transverse vertical wall of the hatch enclosure is secured to an adjacent transverse wall. The construction of each of the covers being such that the panels thereof form accordion-like folds when the covers are retracted for opening the underlying area of the hatch and are expansible into a flat position below the top of the vertical walls of the hatch-enclosing structure when the covers are pulled into closing position for closing the underlying area of the hatch. These covers are operatively slidable along intermediate tracks defined by the recesses 111 in the vertical longitudinal walls of the hatch-enclosing structures.

Each end of each cover panel is provided with a roller 168, the rollers 168 operating in such recesses 111. The closing and opening movements of each of the covers are effected by means of a conventional travelling, rotatable, boom-type crane 170, there being one such crane forward of the superstructure, and another such crane aft of the superstructure, each of these cranes 170 being mounted on a platform 172 which extends transversely across the tops of the vertical walls of the hatch enclosure structure, that is, the longitudinal walls 100 of the forward hatch-enclosing structure and the longitudinal aft hatch-enclosing walls 101. On the tops of these walls there are positioned upper track rails 174 on which run wheels or rollers 176 under approximately corner portions of platforms 172. Track rails 180 are mounted on the upper surface of each platform 172, the crane 170 being mounted on each pair of track rails 180. By means of such rails 180, each of the cranes 170 may move transversely entirely across each hatch and hold and through the provision of platform 172 and rails 174, the cranes 170 may move longitudinally of the hatches and holds.

The cranes 170 also comprise means for closing and opening the accordion interhinged covers by attachment of the hoist boom to the free end panel of each cover and suitable running of the cranes along tracks 174 expanding the covers into flat closing position or folding the panels of each cover together into open position, depending upon the direction of movement of each crane along the rails 174. Obviously the crane-carrying platforms 172 are sufficiently above the complemental cover sections for affording adequate clearance.

Hingedly mounted aft of the superstructure A and connected by hinge connections 137 to the cargo deck 30 are cargo deck extensions 184 which are mounted oppositely to each other on cargo deck 30 on the starboard and port sides thereof. These deck extensions define in effect, oppositely disposed flaps which are in registry with aft lateral cargo ports 134, which communicate into the aft hold 116, and provide space for reception and manipulation of cargo-carrying wheeled vehicles such as a trailer 187, the load of which may be removed by manipulation of forklift 132 of the stacker crane 126 in that hold. The deck extensions 184 may be folded flatly upon the cargo deck 30 by means of their hinges 137 when the extensions are in inoperative position.

It has been noted above that each of the stacker cranes 126 is composed of a pair of telescopically adjusted sections, permitting vertical adjustment of the effective length (or height) of each stacker crane between minimum and maximum. It also has been pointed out that one of these stacker crane constructions is mounted in each hold, the lengthways adjustment of the sections of each of the stacker cranes being obtained through the provision of cables and pulleys in a manner generally similar to extensions ladders, the operation station being movable independently of such adjustment of the extension sections of the stacker crane for selectively adjusting the height of the operator's station and forklift carried thereby and also for effecting desired rotation thereof relative to the stacker crane structure. When not in service, the lateral cargo ports 134 can be covered by removable cover plates 192 provided for such purpose.

A further improvement provided by the present invention is a hull-stabilizing mechanism, provided on both starboard and port sides of the hull. Such mechanism, which preferably is hydraulically operated, is incorporated by providing an aperture 194 in each side of the hull, substantially at the waterline and at approximately the forequarter of the hull. Mounted within the hull and adjacent to each aperture 194 is a bulkhead ram cylinder 196 which houses and reinforces a ram cylinder 198 in which operates telescopically a ram bar 200 which projects through the opening 194 in the hull and which terminates in a stabilizing foot plate 202. This plate 202 is connected pivotally at 204 to the stabilizing bar 200, and when the vessel is run onto a beach or is lying adjacent to a wharf or dock, the stabilizing bar 200 with its foot plate 202 may be extended until the foot plate firmly engages the close, solid and at least approximately flat, surface, within the limits of the pivotal connections 204, so that the foot plate 202 will flatly engage such surface for affording lateral supporting means for inhibiting any excessive tilting of he hull should it become overloaded with cargo on either side. The aperture 194 in the hull is sealed against ingress of water by a packing box 206, which is provided with a recess 208 therein for receiving and housing the stabilizing foot plate 202 when the stabilizing bar and foot plate are retracted into inoperative position.

It will be understood from the foregoing that the above description taken in conjunction with the accompanying drawings, describes an exemplary embodiment of the improvements which are provided by the present invention, it being apparent that structural details of the improvements may be modified by circumstances of installation and service as will be apparent to one skilled in the art, without departing from the spirit and substance of the invention and accordingly, it will be understood that it is intended and desired to embrace within the scope of the invention such modifications and changes as may be necessary or desirable to adapt it to varying conditions and uses, as defined in the appended claims.

We claim:

1. A cargo ship construction for transporting items of cargo which comprises, in combination, a hull interiorly divided into cargo-receiving holds, a weather-deck on the hull extending longitudinally thereof from a foredeck to stern, extensions for the weather-deck hingedly connected to the weather-deck and extending forwardly along the hull and being foldable against the hull for stowage, a loading ramp extending from each forward weather-deck extension to a cargo-distributing surface, the holds having cargo-receiving hatches open in the weather-deck, hatch-enclosing means including a structure having vertical walls extending upwardly from the weather deck and disposed around the hatches, opposite longitudinal walls of the hatch-enclosing structure being provided with opposite corresponding recesses, track rails in the recesses defining a bottom track, an intermediate track, and a top track, the tracks extending longitudinally of the hatches, a crane means for each hold including a carrying frame mounted on the bottom track for longitudinal movement through its hold, the carrying frame extending transversely across its hatch and also being provided with track means extending transversely across its hatch, cargo stacking crane means suspended from the transversely-extending track means on the carrying frame, forklift means on the cargo-stacking crane means, the walls of the hatch-enclosing structure being provided with lateral openings communicating with the weather-deck, the said forklift means being extensible and retractable selectively with respect to said lateral openings for transferring cargo between the weather-deck and hold, foldable cover means for the hatch mounted on the intermediate track, an actuating crane for the cover means mounted on the top track, the actuating crane being rotatable and mounted on carriage means for the crane longitudinally movable on the top track, the carriage means extending transversely across the cover and enabling the crane to move transversely across the hatch, the crane also including a hoisting boom and a hoisting rig carried by the boom and adapted to be connected to articles of cargo for transferring such articles through the hatch, oppositely extending lateral weather-deck extensions hingedly connected with the weather-deck, the weather-deck extensions being foldable upon the weather-deck for stowage and hull-stabilizing mechanism mounted within the hull and extensible from the hull for laterally supporting the hull against tilting during cargo manipulating operations.

2. In an apparatus for shifting items of cargo comprising in combination, a deck defining a cargo enclosure in the deck, the enclosure including opposite side walls and opposite end walls extending upwardly from the deck, spaced openings in the walls for transferring items of cargo into and from the enclosure, selectively, lower track means on upper portions of the side walls extending longitudinally with respect to the enclosure, a carrying frame on said lower track means adapted to travel thereon longitudinally with respect to the enclosure, the carrying frame extending transversely across the enclosure and including transversely extending track means extending transversely across the enclosure, carriage means on the transversely extending track means for movement therealong across the enclosure, cargo stacking crane mechanism rotatably suspended from the carriage means and depending therefrom into the said enclosure, said stacking crane mechanism including vertically telescoping sections, means for effecting selected telescoping adjustments between the sections for selectively adjusting the height of the sections relative to the enclosure corresponding to heights of cargo being moved, an operator's station mounted on the crane sections and rotatable therewith and lifting devices on the operator's station for engaging and moving items of cargo, the lifting devices being extensible through the openings in the walls of the enclosure whereby cargo can be selectively moved between locations on the deck adjacent said openings and locations within said cargo enclosure.

3. Apparatus as claimed in claim 2, wherein the lifting devices are lift fork blades extending outwardly with respect to the operator's station.

4. Apparatus as claimed in claim 2 further including cover means comprising a series of hingedly interconnected panel members extending across the cargo enclosure above the stacking crane, a terminal panel member being secured to an end wall of the cargo enclosure, intermediate track means on the side walls of the enclosure extending longitudinally relative to the enclosure and positioned above said lower track means, cover operating means for selectively expanding said panel members with respect to each other to a covering position over the enclosure and retracting said panel members to an open position relative to the enclosure, and mounting means mounting the panel members movably on said intermediate track means.

5. Apparatus as claimed in claim 4 wherein the cover operating means comprise a travelling rotatable hoisting crane means including a cab, rotatable turntable means for effecting rotation of the cab, a hoisting boom mounted in the cab, hoisting means on the hoisting boom adapted to be connected alternatively to the cover means and to items of cargo, upper track means for the hoisting crane means mounted on the side walls of the cargo enclosure above said intermediate track means, and additional means extending transversely across the cover means for enabling the hoisting crane means to move across and above the cover means while said upper track means enable the hoisting crane means to move longitudinally with respect to the cargo enclosure and the cover means therefor.

6. Apparatus as claimed in claim 2, including forward longitudinal extensions for the deck hingedly connected to the deck for vertical folding relative thereto when the extensions are inoperative, ramp devices connecting the extensions for the deck with cargo assembly stations for enabling ready shifting of cargo between the deck and stations, aft deck extensions laterally projecting from the deck in opposite directions when in operative position, and hinge connections between the deck and the aft deck extensions enabling the latter to be folded upon the deck when inoperative, the said extensions being adjacent to aft openings in the walls of the cargo enclosure structure for accessibility thereto of the lifting devices on the cargo stacking crane.

7. A cargo ship comprising a cargo receiving hold; a hatch enclosure enclosing the top of said cargo receiving hold, said hatch enclosure including cover means and a pair of substantially vertical, longitudinally extending side walls having lateral openings therethrough; a weather deck extending outwardly from each of said sidewalls adjacent to the bottom of said lateral openings adapted to accommodate cargo and cargo carrying vehicles during loading and unloading of the ship; a lower track extending substantially the length of said cargo hold comprising a pair of rails mounted opposite each other along the interiors of said side walls; a carrying frame extending transversely across said cargo hold and adapted to travel along said lower track, said carrying frame including a stacker crane track transverse to said cargo hold; a stacker crane at all times beneath and depending from said carrying frame and adapted to travel along said stacker crane track, said stacker crane having rotating means for rotating said stacker crane about a vertical axis and cargo engaging means capable of projecting through the lateral openings in said side wall and adapted to be selectively raised and lowered; whereby said carrying frame, stacker crane, and cargo engaging means are adapted to move cargo between locations on the weather deck adjacent said lateral openings and selected locations within the hold of said ship.

8. A cargo ship as described in claim 7 wherein said stacker crane includes vertically, telescopically adjustable sections; means for adjusting said sections with respect to each other; vertical side rails; an operator's station mounted for selective vertical travel up and down said side rails; and forklift means carried by said operator's station.

9. A cargo ship as described in claim 7 and comprising an intermediate track extending substantially the length of said cargo hold above said lower tracks comprising a pair of rails mounted opposite each other along the interiors of said side walls; complementary hatch cover sections for the hatch enclosure mounted on said intermediate track, each section having a plurality of accordian-like interhinged panels extending transversely across said hatch enclosure, the sections cooperating to cover the hatch when in their expanded positions; a top track extending substantially the length of said cargo hold above said intermediate track comprising a pair of rails mounted opposite each other near the top edges of said side walls; and a travelling, rotatable, boom-type crane mounted on said top tracks adapted to selectively open and close said latch cover sections and, when said hatch cover sections are open, to transfer cargo between said hold and other locations on and off the ship.

References Cited in the file of this patent

UNITED STATES PATENTS

| 2,660,319 | Dorland | Nov. 24, 1953 |

FOREIGN PATENTS

| D. 17,582 | Germany | Dec. 22, 1955 |
| 142,974 | Australia | Feb. 23, 1950 |
| 1,072,041 | France | Sept. 7, 1954 |
| 1,005,903 | Germany | Apr. 4, 1957 |
| 869,352 | Great Britain | May 31, 1961 |